US012704262B2

(12) United States Patent
Sampath et al.

(10) Patent No.: US 12,704,262 B2
(45) Date of Patent: Aug. 11, 2026

(54) TURBINE ENGINE HAVING A FUEL NOZZLE ASSEMBLY

(71) Applicant: GENERAL ELECTRIC COMPANY, Evendale, OH (US)

(72) Inventors: Karthikeyan Sampath, Bengaluru (IN); Maximilian Zahn, Munich (DE); Pradeep Naik, Bengaluru (IN); Prithiviraaj Pet T, Madurai (IN); Pabitra Badhuk, Jhargram (IN); Sibtosh Pal, Mason, OH (US); Michael T. Bucaro, Arvada, CO (US); Steven C. Vise, Loveland, OH (US); Steven Marakovits, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/032,851

(22) Filed: Jan. 21, 2025

(65) Prior Publication Data

US 2026/0210549 A1 Jul. 23, 2026

(51) Int. Cl.
*F23R 3/28* (2006.01)
*F02C 7/22* (2006.01)
(Continued)

(52) U.S. Cl.
CPC ................ *F23R 3/286* (2013.01); *F02C 7/22* (2013.01); *F23D 14/82* (2013.01); *F23R 3/04* (2013.01)

(58) Field of Classification Search
CPC ............. F23R 3/286; F02C 7/22; F23D 14/85
See application file for complete search history.

(56) References Cited

U.S. PATENT DOCUMENTS 2,616,257 A 11/1952 Mock
4,408,461 A 10/1983 Bruhwiler et al.
(Continued)

FOREIGN PATENT DOCUMENTS

CN 112815356 A 5/2021
CN 113551263 A 10/2021
(Continued)

OTHER PUBLICATIONS

Partial European Search Report for Application No. 26150106.8 dated May 18, 2026, 15 pages.

*Primary Examiner* — Gerald L Sung
(74) *Attorney, Agent, or Firm* — Carter, DeLuca & Farrell, LLP

(57) ABSTRACT

A turbine engine comprising: a compressor section, a combustion section, and a turbine section in serial flow arrangement, with the combustion section comprising a combustion chamber and a fuel nozzle assembly fluidly coupled with the combustion chamber at a fuel nozzle assembly outlet, wherein the fuel nozzle assembly comprises a gaseous fuel passage defined by an inner surface of a centerbody, a plurality of annularly shaped air supply passages circumscribing the centerbody including at least a first air supply passage and a second air supply passage circumscribing the first air supply passage, at least one splitter having an annular shape circumscribing the centerbody and separating adjacent air supply passages of the plurality of air supply passages, a fuel nozzle body circumscribing the plurality of air supply passages and the at least one splitter and at least one orifice plate disposed within one of the plurality of the air supply passages.

19 Claims, 9 Drawing Sheets

(51) Int. Cl.
*F23D 14/82* (2006.01)
*F23R 3/04* (2006.01)

(56) References Cited

U.S. PATENT DOCUMENTS

| | | | | |
|---|---|---|---|---|
| 6,367,262 | B1 | 4/2002 | Mongia et al. | |
| 6,622,944 | B1 | 9/2003 | Hurley et al. | |
| 7,017,329 | B2 | 3/2006 | Farhangi et al. | |
| 7,343,745 | B2 | 3/2008 | Inoue et al. | |
| 7,824,165 | B2 | 11/2010 | Davie et al. | |
| 8,205,452 | B2 | 6/2012 | Boardman et al. | |
| 8,266,911 | B2 | 9/2012 | Evulet | |
| 8,443,607 | B2 | 5/2013 | York et al. | |
| 9,126,210 | B1 | 9/2015 | Acharya | |
| 10,865,989 | B2 | 12/2020 | Sadasivuni | |
| 10,995,958 | B2 | 5/2021 | Shershnyov et al. | |
| 11,054,137 | B2 | 7/2021 | Choi | |
| 11,085,643 | B2 | 8/2021 | Freeman et al. | |
| 11,635,208 | B2 | 4/2023 | Choi | |
| 11,662,095 | B2 | 5/2023 | Cho et al. | |
| 11,746,704 | B2 | 9/2023 | Asai et al. | |
| 2010/0162716 | A1 | 7/2010 | Bastnagel et al. | |
| 2010/0275604 | A1 | 11/2010 | Hall | |
| 2010/0300102 | A1* | 12/2010 | Bathina | F23R 3/12 60/737 |
| 2011/0162379 | A1 | 7/2011 | Baruah et al. | |
| 2011/0185703 | A1 | 8/2011 | Dodo et al. | |
| 2011/0289928 | A1* | 12/2011 | Fox | F23R 3/34 60/740 |
| 2011/0289933 | A1* | 12/2011 | Boardman | F23R 3/14 60/776 |
| 2012/0151928 | A1 | 6/2012 | Patel et al. | |
| 2012/0291439 | A1* | 11/2012 | Oskam | F23R 3/286 60/737 |
| 2013/0019602 | A1* | 1/2013 | Kim | F23R 3/286 60/725 |
| 2014/0109582 | A1 | 4/2014 | Shershnyov et al. | |
| 2015/0000299 | A1 | 1/2015 | Zuo et al. | |
| 2016/0010864 | A1 | 1/2016 | Abe et al. | |
| 2016/0040881 | A1* | 2/2016 | Cunha | F23R 3/14 60/752 |
| 2016/0061452 | A1* | 3/2016 | Walker | F23R 3/286 60/737 |
| 2016/0290646 | A1 | 10/2016 | Abe et al. | |
| 2017/0307218 | A1 | 10/2017 | Miyauchi et al. | |
| 2017/0350598 | A1* | 12/2017 | Boardman | F23R 3/14 |
| 2019/0137103 | A1 | 5/2019 | Choi | |
| 2019/0203929 | A1* | 7/2019 | Benjamin | F23R 3/286 |
| 2022/0099299 | A1 | 3/2022 | Carrotte et al. | |
| 2023/0194095 | A1* | 6/2023 | Vukanti | F02C 3/22 60/748 |
| 2023/0204213 | A1 | 6/2023 | Naik et al. | |
| 2023/0213194 | A1* | 7/2023 | Naik | F23R 3/14 60/737 |

FOREIGN PATENT DOCUMENTS

| | | | |
|---|---|---|---|
| DE | 920720 | C | 11/1954 |
| EP | 2442026 | A1 | 4/2012 |
| EP | 4202303 | A1 | 6/2023 |
| WO | 2013/065624 | A1 | 5/2013 |

* cited by examiner

TURBINE ENGINE HAVING A FUEL NOZZLE ASSEMBLY

TECHNICAL FIELD

The present subject matter relates generally to a turbine engine having a combustion section that includes a fuel nozzle assembly.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. Byproducts of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
FIG. 1 is a schematic view of a turbine engine having a compression section, a combustion section, and a turbine section.
Figure 1:
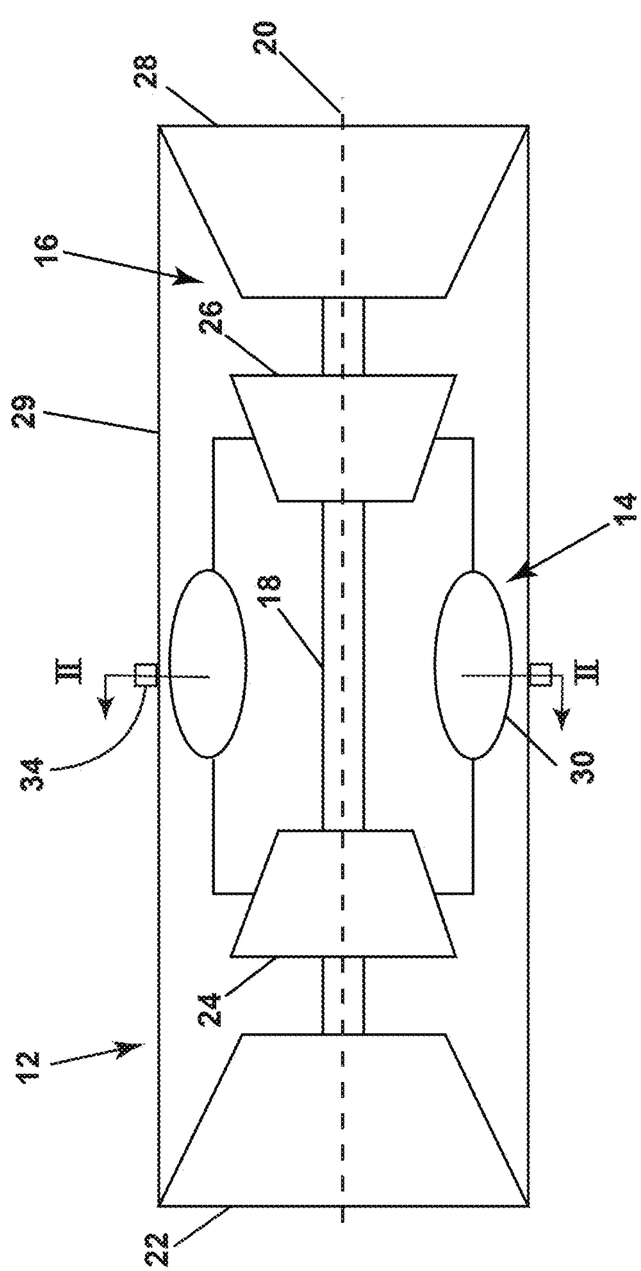

Aspects of the disclosure described herein are directed to a fuel nozzle assembly located in a combustion section of a turbine engine. Efficiency and emission needs for turbine engines require fuels that burn hotter and faster than traditional fuels. With some aspects, the disclosed fuel nozzle assemblies can be utilized with a gaseous fuel such as 100% hydrogen fuel. Use of gaseous fuel, including hydrogen fuel, can eliminate carbon emissions and reduce $NO_x$ emissions, but generates challenges relating to flashback or flame holding due to the higher burn temperature and speed of gaseous fuel compared to liquid fuels such as Jet A. The disclosed fuel nozzle assembly, including a premixer, facilitates mixing of fuel and air in a mixing area upstream of a combustion chamber. Improved mixing of fuel and air in the premixer results in better flame stability in the combustion chamber, which ultimately reduces $NO_x$ emissions of the turbine engine.

The fuel nozzle assembly includes a fuel nozzle body that defines a fuel nozzle assembly centerline. The fuel nozzle body converges towards the fuel nozzle assembly centerline at a downstream portion of the fuel nozzle body.

The fuel nozzle assembly further includes a hollow centerbody which defines a gaseous fuel supply passage therein. The fuel nozzle body circumscribes an outer surface of the centerbody. Annular air supply passages are defined between an outer surface of the centerbody and an inner surface of the fuel nozzle body. Adjacent air supply passages are separated by an annularly shaped splitter. A downstream portion of the splitter converges towards the fuel nozzle assembly centerline and a downstream terminal end of the splitter is formed in a chevron shape generally pointing towards the mixing area. An orifice plate is disposed within one or more of the air supply passages to impact the flow of air therethrough. The orifice plate decreases the speed, volume, pressure, or any combination thereof of air flowing therethrough. That is, the orifice plate can partially obstruct the flow of air, which can generate a pressure drop along the respective air supply passage. While illustrated as an orifice, other structures that impact the flow of air are contemplated.

Optionally, additional air supply passages that do not include flow impact structures such as the orifice plate can provide air at a higher velocity than an air supply passage with an orifice plate. By supplying air to the mixing area at different velocities, shear layers between the air supply passages will have high velocity gradients. Further, the flow of air over the chevron shape of the downstream terminal end of the splitter creates counter-rotating vortices which increases transport across the gaseous supply passages. The differing velocity between the air supply passages and the vortices generated by the chevron shape of the splitter ensures mixing of fuel and air and lessens or prevents flashback or flame holding in the combustion chamber.

While described with respect to a turbine engine, it should be appreciated that the combustor as described herein can be for any engine having a combustor. The combustor as described herein can be implemented in various engines, including but not limited to engines with propeller sections or fan and booster sections, along with turbojet, turboprop, turboshaft, and turbofan engines. Aspects of the disclosure discussed herein can have general applicability within nonaircraft engines having a combustor, such as other mobile applications and non-mobile industrial, commercial, and residential applications.

With the combustors and fuel nozzle assemblies described herein, the hydrogen-based fuel can be gaseous hydrogen fuel used without the need of diluents. In some embodiments, no diluent is added to the combustion chamber and the fuel is substantially completely diatomic hydrogen without diluent. As used herein, the term "substantially completely," as used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a turbine engine or vehicle and are based on a normal operational attitude of the turbine engine or vehicle. More particularly, forward and aft are used herein with reference to a direction of travel of the vehicle and a direction of propulsive thrust of the turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" can be a gas or a liquid. The term "fluidly coupled" means that a fluid is capable of making the connection between the areas specified.

The term "flame holding" relates to the condition of continuous combustion of a fuel such that a flame is maintained along or near to a component, and usually a portion of the fuel nozzle assembly as described herein, and "flashback" relate to a retrogression of the combustion flame in the upstream direction.

The term "nozzle" has been used in various ways in the context of turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, above, below, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one. Uses of "and" and "or" are to be construed broadly. For example, and without limitation, uses of "and" do not necessarily require all elements or features listed, and uses of "or" are inclusive unless such a construction would be illogical.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other and defines a rotational axis that is an engine centerline 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially spaced rotating blades and a set of circumferentially spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about and enshroud one or more sections of the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages (not illustrated), with each stage having a set of circumferentially spaced, rotating blades and a set of circumferentially spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30. A shroud or casing 29 can enshroud or cover at least a portion of the combustion section 14.

Figure 3:
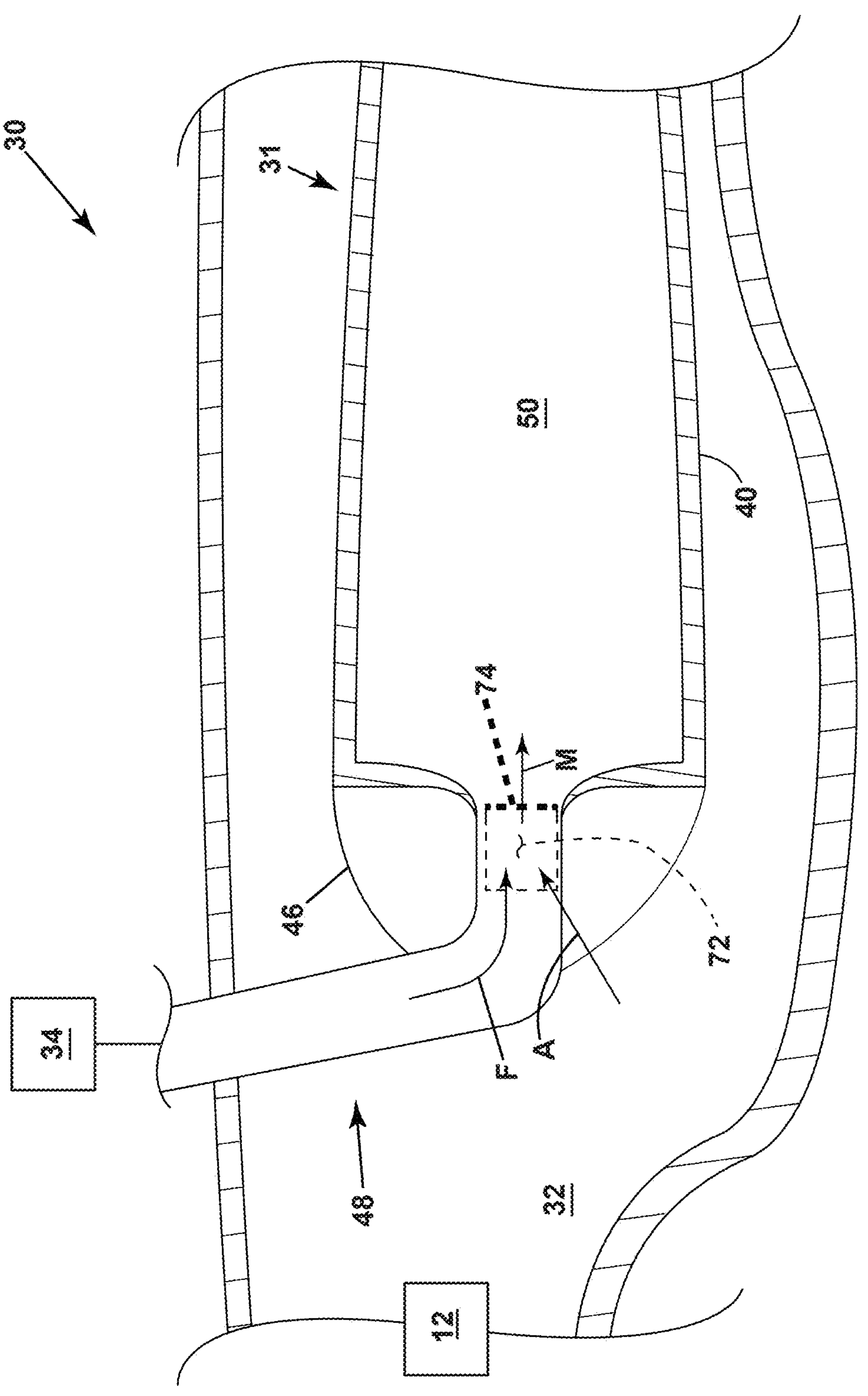
FIG. 3 is a schematic cross-sectional view of a combustor portion of FIG. 2 along line III-III including a fuel nozzle assembly and a portion of a combustion chamber in accordance with various aspects described herein.

During operation of the turbine engine 10, ambient or atmospheric air is drawn into the compressor section 12 via a fan upstream of the compressor section 12, where the air is compressed defining a pressurized air A (FIG. 3). The air A can then flow into the combustion section 14 where the air A is mixed with fuel F (FIG. 3) to form a fuel air-mixture M (FIG. 3) and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section downstream of the turbine section 16. The driving of the LP turbine 28 drives the LP spool to rotate the fan and the LP compressor 22. The pressurized airflow and the combustion gases can together define a working airflow that flows through the fan, compressor section 12, combustion section 14, and turbine section 16 of the turbine engine 10.

Figure 2:
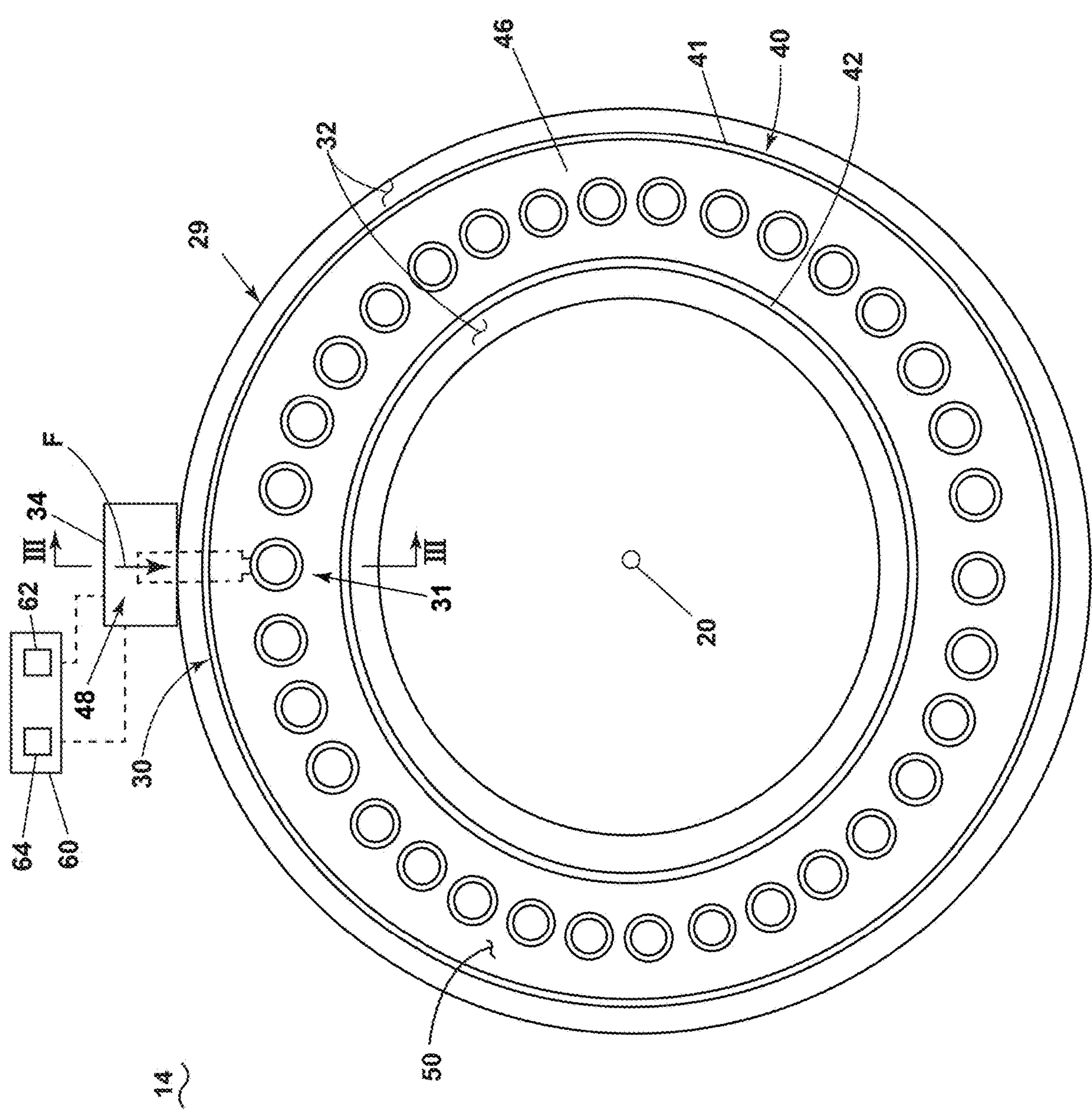
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustor 30 can include a circumferentially spaced set of combustor portions 31 disposed around the engine centerline 20 of the turbine engine 10 (e.g., circumferentially spaced from each other in an annular configuration) (FIG. 1). The set of combustor portions 31 can, in some configurations, include or be configured as combustor cups, fuel cups, or nozzle cups. The combustor 30 can have a can, can-annular, or annular arrangement depending on the type of engine in which the combustor 30 is located.

The combustor 30 can be at least partially defined by a combustor liner 40. In some examples, the combustor liner 40 can include an outer liner 41 and an inner liner 42 concentric with respect to each other and arranged in an annular fashion about the engine centerline 20. In some examples, the combustor liner 40 can have an annular structure about the combustor 30. In some examples, the combustor liner 40 can include multiple segments or portions collectively forming the combustor liner 40. In some examples, the combustor liner 40 can include the outer liner 41 radially spaced from the inner liner 42 with respect to the engine centerline 20. In some examples, the combustor liner 40 can include a single liner.

The combustor liner 40 can at least partially define a combustion chamber 50 arranged annularly about the engine centerline 20. For example, a wall 46 (e.g., a dome wall) can be perpendicular to the engine centerline 20 and can cooperate with the outer liner 41, the inner liner 42, or both, to at least partially define the combustion chamber 50. A compressed air supply 32 can be defined at least in part by both the combustor liner 40 and the shroud or casing 29. As used herein, the term "perpendicular" refers to generally perpendicular, where the angle between a first line or first plane and a second line or second plane are in a range from 700 to 110°. For example, intersection of a plane defined by the wall 46 and the engine centerline 20 can form an angle in a range from 80° to 100°.

The combustor 30 can include or be fluidly coupled to a fuel source 34 (e.g., a fuel manifold or conduit) by a fuel nozzle assembly 48. A fuel F can include any suitable fuel, including gaseous fuel, such as hydrogen fuel, which can include 100% $H_2$ (e.g., without a diluent). The fuel source 34 can be a gaseous fuel supply (e.g., a gaseous hydrogen fuel supply). In some examples, other fuels can be utilized instead of or with the gaseous fuel (e.g., hydrogen). The fuel nozzle assembly 48 fluidly connects the combustion chamber 50 with the fuel source 34. The fuel nozzle assembly 48 can be a gaseous fuel nozzle assembly, such as a gaseous hydrogen fuel nozzle assembly.

Fuel nozzle assembly 48 can be included in a lean cup. Lean cups define an area where a lean mixture of air and fuel is provided having a ratio of fuel to air with a higher concentration of air such that the ratio of air to fuel is higher than the stoichiometric air to fuel ratio. Lean cups can control dynamics, reduce NOx, and increase the life of the combustor liner 40. Due to the comparatively lower amount of fuel in a lean cup compared to, for example, a rich cup, effective mixing of fuel and air is particularly important for controlling flame shape.

The combustor portions 31 can be arranged in a circumferentially spaced configuration. The combustor portions 31 can be disposed at a radial distance from the engine centerline 20 that is greater than a radial distance of the inner liner 42 and less than a radial distance of the outer liner 41. A controller 60 can be connected to and at least partially control operation of the fuel source 34 and the fuel nozzle assembly 48, or a combination thereof. The controller 60 can include a processor 62 and a memory 64.

FIG. 3 depicts a cross-section view of the fuel nozzle assembly 48 and a combustor portion 31 of the combustor 30 along line III-III in FIG. 2. The fuel nozzle assembly 48 includes a premixer 72. The fuel nozzle assembly 48 is fluidly coupled with the fuel source 34 providing fuel F, and an air source providing air A. The air source can be a compressed air supply from one or more of the compressed air supply 32 or the compressor section 12. The fuel nozzle assembly 48 terminates at a fuel nozzle assembly outlet 74 that is fluidly coupled to the combustion chamber 50 providing a mixture M of fuel F and air A. In order to fluidly couple the fuel nozzle assembly 48 with the combustion chamber 50, a portion of the fuel nozzle assembly 48 can pass through at least one of the combustor liner 40 or the wall 46. In some configurations, the fuel nozzle assembly 48 can be coupled to the combustor liner 40 via the wall 46. In other configurations, the fuel nozzle assembly 48 can be coupled directly to the combustor liner 40.

Figure 4:
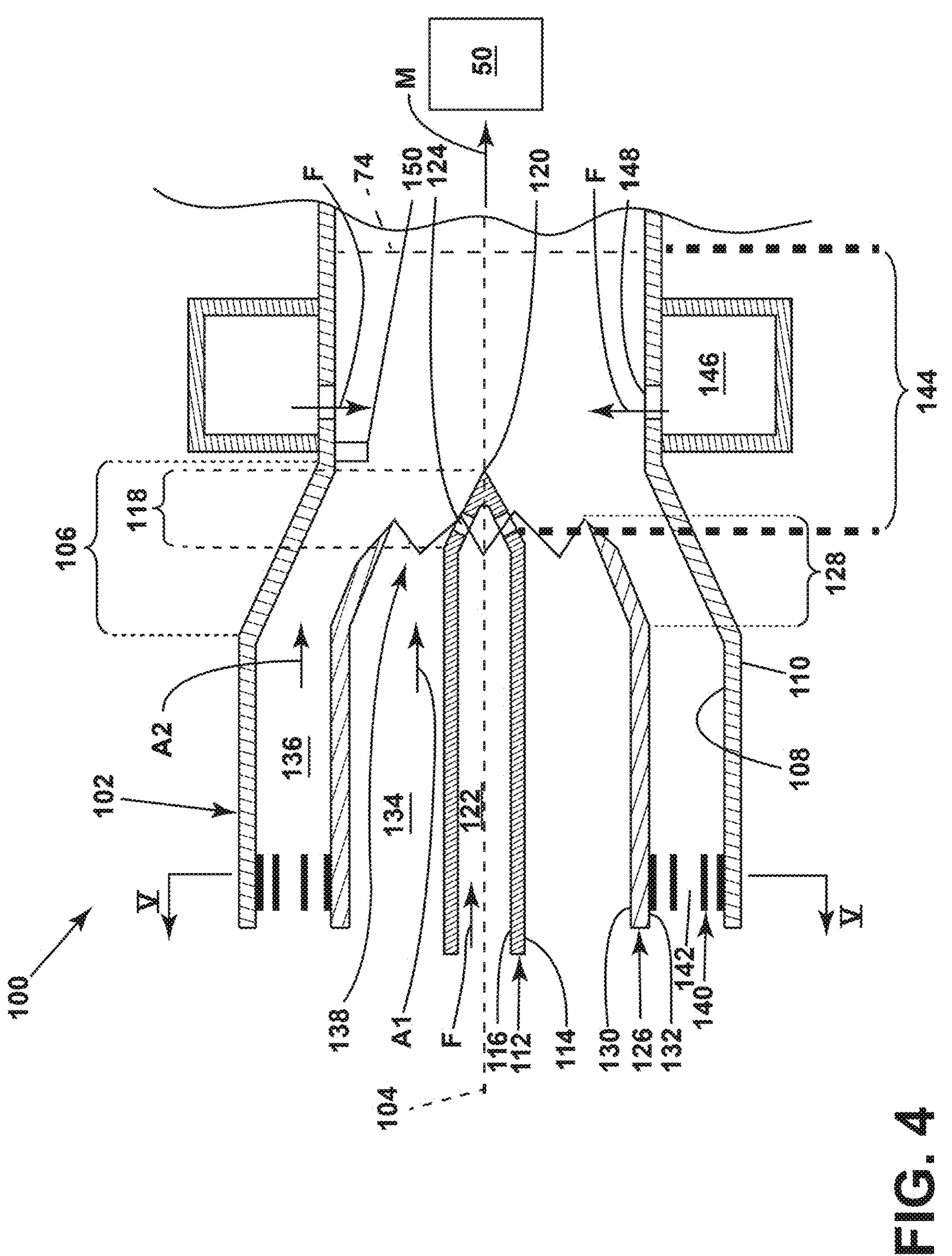
FIG. 4 is a schematic cross-sectional view further illustrating a portion of the fuel nozzle assembly of FIG. 3 in accordance with various aspects described herein.

FIG. 4 depicts an exemplary premixer 100 suitable for use as the premixer 72 of FIG. 3. The premixer 100 is defined in part by a fuel nozzle body 102 of the fuel nozzle assembly 48 (FIG. 3). The fuel nozzle body 102 defines a premixer centerline 104. A downstream portion of the fuel nozzle body 102 can include a tapered portion 106 that converges towards the premixer centerline 104. That is, a cross-sectional area of the fuel nozzle body 102 measured in a direction perpendicular to the premixer centerline 104 decreases from an upstream portion to a downstream portion of the fuel nozzle body 102. The fuel nozzle body 102 includes an inner fuel nozzle body surface 108 and an outer fuel nozzle body surface 110, the inner fuel nozzle body surface 108 being located radially inward of the outer fuel nozzle body surface 110 with respect to the premixer centerline 104.

A centerbody 112 is spaced from and circumscribed by the fuel nozzle body 102. Circumscribing, as used herein, refers to continuously or discontinuously surrounding including partially surrounding or completely surrounding. The fuel nozzle body 102 can partially or completely circumscribe the centerbody 112. The centerbody 112 includes an outer centerbody surface 114 and an inner centerbody surface 116, the outer centerbody surface 114 being located radially outward of the inner centerbody surface 116 with respect to the premixer centerline 104. The centerbody 112 includes a tapered nose portion 118 at its downstream end. The tapered nose portion 118 confronts the combustion chamber 50. In other words, the tapered nose portion 118 is tapered to a downstream terminal end 120 that faces the combustion chamber 50.

A gaseous fuel supply passage is illustrated as a first fuel supply passage 122 that is defined by the inner centerbody surface 116. An upstream portion of the first fuel supply passage 122 is fluidly connected to the fuel source 34 (FIG. 3). That is, the first fuel supply passage 122 receives a gaseous fuel F, fluidly coupling the fuel source 34 (FIG. 3) to a first fuel outlet 124. The first fuel outlet 124 is illustrated as a plurality of through holes that extend through the centerbody 112 from the outer centerbody surface 114 to the inner centerbody surface 116. Although illustrated as two through holes, the first fuel outlet 124 can include any number of through holes extending through the tapered nose portion 118 of the centerbody 112. The first fuel outlet 124 is located at the tapered nose portion 118 of the centerbody 112.

At least one annularly shaped splitter, illustrated in FIG. 4 as a first splitter 126, is located between the inner fuel nozzle body surface 108 and the outer centerbody surface 114. That is, at least part of the centerbody 112 is circumscribed by the first splitter 126 and at least part of the first splitter 126 is circumscribed by the inner fuel nozzle body surface 108.

A downstream portion of the first splitter 126 can include a tapered portion 128 that converges towards the centerbody 112. Additionally or alternatively, the tapered portion 128 can converge towards the premixer centerline 104. That is, a cross-sectional area of the first splitter 126 measured in a direction perpendicular to the premixer centerline 104 decreases from an upstream portion to a downstream portion of the premixer 100. The tapered portion 128 of the first splitter 126 can be parallel or non-parallel with the tapered portion 106 of the fuel nozzle body 102. The tapered portion 106 of the fuel nozzle body 102 can axially overlap at least a portion of the tapered portion 128 of the first splitter 126.

The first splitter 126 includes an inner first splitter surface 130 and an outer first splitter surface 132, the inner first splitter surface 130 being located radially inward of the outer first splitter surface 132 with respect to the premixer centerline 104. The inner first splitter surface 130 is spaced from and can optionally confront the outer centerbody surface 114. Further, the outer first splitter surface 132 is spaced from and can optionally confront the inner fuel nozzle body surface 108.

A first air supply passage 134 is defined by the outer centerbody surface 114 and the inner first splitter surface 130. In other words, a first air stream A1 flows through an annular passage defined by the outer centerbody surface 114 and the inner first splitter surface 130.

A second air supply passage 136 is defined by the outer first splitter surface 132 and the inner fuel nozzle body surface 108. In other words, a second air stream A2 flows through an annular passage defined by the outer first splitter surface 132 and the inner fuel nozzle body surface 108. This configuration results in the second air supply passage 136 circumscribing the first air supply passage 134.

The tapered portion 128 of the first splitter 126 terminates at a shaped edge illustrated as a first chevron shaped edge 138. The first chevron shaped edge 138 is located at a downstream terminal end of the first splitter 126. The downstream terminal end of the first splitter 126 including the first chevron shaped edge 138 converges towards the centerbody 112. While illustrated as having a chevron shape, the shaped portion at the downstream terminal end of the first splitter 126 can have other shapes that can include any combination of linear or curved portions.

At least one orifice plate can be located in an air supply passage. As illustrated, by way of example, an orifice plate 140 is located within the second air supply passage 136. While illustrated within the second air supply passage 136, it is contemplated, in a different and non-limiting example, that the orifice plate 140 can be located in the first air supply passage 134. Additionally, or alternatively the at least one orifice plate can include more than one orifice plate being disposed within any number of air supply passages. For example, an orifice plate can be disposed in each of the first air supply passage 134 and the second air supply passage 136. A plurality of apertures 142 extend through the orifice plate 140.

A mixing section 144 is defined by the inner fuel nozzle body surface 108 confronting the combustion chamber 50. The mixing section 144 is located downstream of the first fuel outlet 124 and upstream of the combustion chamber 50. Additionally or alternatively, the mixing section 144 can be located downstream of the first splitter 126 or the centerbody 112.

Optionally, in addition to the first fuel supply passage 122, the fuel nozzle body 102 can include or couple to a second fuel supply passage 146. That is, optionally, the outer fuel nozzle body surface 110 can at least partially define the second fuel supply passage 146. The second fuel supply passage 146 fluidly couples a fuel source (e.g., fuel source 34 or another fuel source) to a second fuel outlet 148. Although the second fuel outlet 148 is depicted on a portion of the fuel nozzle body 102 that is parallel with the premixer centerline 104, the second fuel outlet 148 can alternatively or additionally be disposed on the tapered portion 106 of the fuel nozzle body 102. That is, while illustrated as downstream of the downstream terminal end 120 of the centerbody 112, it is contemplated in a different and non-limiting example that the second fuel supply passage 146 can axially overlap the centerbody 112.

Optionally, a fuel post 150 can extend from the inner fuel nozzle body surface 108 towards the premixer centerline 104. The fuel post 150 can be annular about the second fuel outlet 148 or can be protrusion disposed between the first splitter 126 and the second fuel outlet 148.

Figure 5:
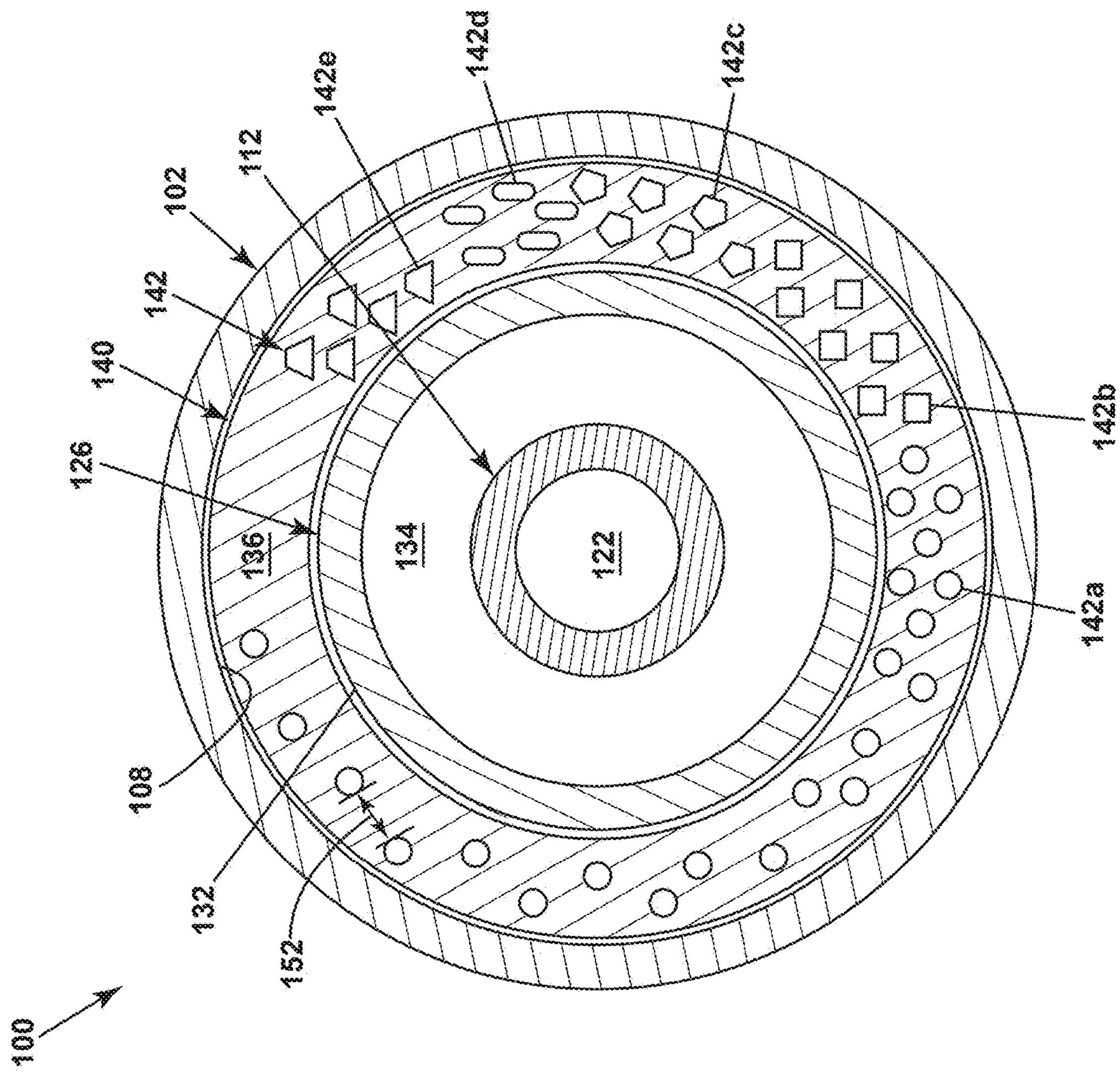
FIG. 5 is a schematic cross-sectional view of a portion of a premixer of FIG. 4 along line V-V further illustrating an orifice plate in accordance with various aspects described herein.

FIG. 5 illustrates a cross-sectional view of the premixer 100 along line V-V from FIG. 4. The centerbody 112 defines the first fuel supply passage 122. The first splitter 126 together with the centerbody 112 defines the first air supply passage 134. The fuel nozzle body 102 together with the first splitter 126 defines the second air supply passage 136. A gap is illustrated between the orifice plate 140 and the inner fuel nozzle body surface 108 only to ease understanding. It is contemplated that there can be a gap or a portion of or all of the orifice plate 140 can be in direct contact with the inner fuel nozzle body surface 108. That is, a gap need not be present between the orifice plate 140 and the inner fuel nozzle body surface 108. A gap is illustrated between the orifice plate 140 and the outer first splitter surface 132 only to ease understanding. It is contemplated that there can be a gap, or a portion of or all of the orifice plate 140 can be in direct contact with the outer first splitter surface 132. That is, a gap need not be present between the orifice plate 140 and outer first splitter surface 132.

The orifice plate 140 includes the plurality of apertures 142. The plurality of apertures 142 can be any shape that can create a pressure drop when gas, such as air A, flows therethrough. In non-limiting examples, the shape of the apertures 142 can include circles 142*a*, polygons such as squares or rectangles 142*b*, pentagons 142*c*, elongated circles or ovals 142*d*, trapezoids 142*e*, or a combination thereof.

The plurality of apertures 142 collectively defines a porosity or an open area of the orifice plate 140 through which air A can pass. The plurality of apertures 142 can include any number of apertures. Additionally or alternatively, the cross-sectional area of each aperture of the plurality of apertures 142 can vary. Although the plurality of apertures 142 are depicted around the entire orifice plate 140, additionally or alternatively still, the plurality of apertures 142 can be located in only part of the orifice plate 140. Further, although the plurality of apertures 142 are depicted with varying interspatial distance between adjacent apertures of the plurality of apertures 142, such as interspatial distance 152, the interspatial distance between adjacent apertures of the plurality of apertures 142 can be equal, non-equal, or a combination thereof.

It will be appreciated that increasing the open area of the orifice plate 140 can be achieved by increasing the number of the plurality of apertures 142, increasing the size of some or all of the plurality of apertures 142, decreasing the interspatial distance between adjacent apertures of the plurality of apertures 142, or a combination thereof. Conversely, it will be appreciated that decreasing the open area of the orifice plate can be achieved by decreasing the number of the plurality of apertures 142, decreasing the size of some or all of the plurality of apertures 142, increasing the interspatial distance between adjacent apertures of the plurality of apertures 142, or a combination thereof. In some examples, the porosity or open area of the orifice plate 140 can be in a range from greater than or equal to 20% and less than or equal to 80% of a total area of the orifice plate 140.

Figure 6:
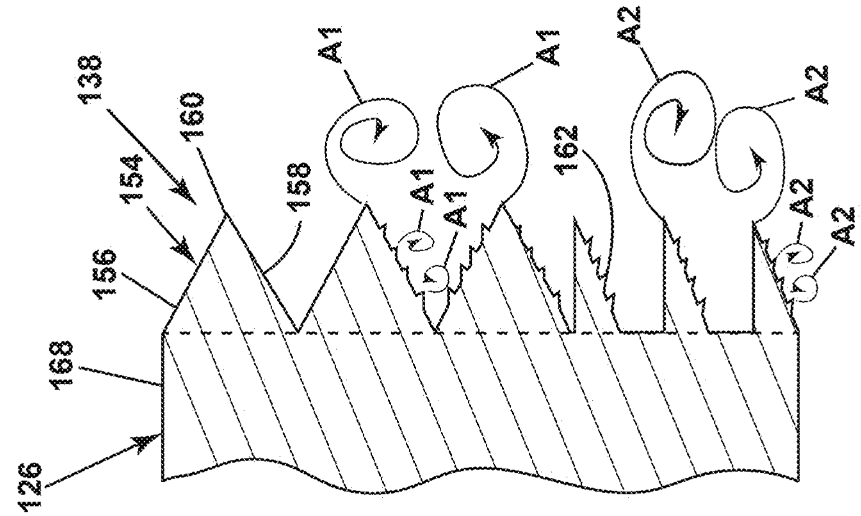
FIG. 6 is a schematic view of a portion of a splitter of the premixer of FIG. 5 in accordance with various aspects described herein.

FIG. 6 depicts details of a portion of the first splitter 126. The first chevron shaped edge 138 of the first splitter 126 includes a set of turbulators 154. The set of turbulators 154 extend in a triangle shape from an upstream portion 168 of the first splitter 126 to the first chevron shaped edge 138 of the first splitter 126. Each turbulator of the set of turbulators 154 includes a first edge 156 and a second edge 158 that converge at a major peak 160 confronting the combustion chamber 50 (FIG. 4). A length of the first edge 156 and the second edge 158 can be equal or non-equal. That is, the triangle shape of a turbulator of the set of turbulators 154 can be an isosceles triangle where the length of the first edge 156 and the length of the second edge 158 are equal. Some or all of the turbulators of the set of turbulators 154 can further include a set of mini turbulators 162. The set of mini turbulators 162 are triangular shaped protrusions extending from one or both of the first edge 156 and the second edge 158. The set of mini turbulators 162 also confront the combustion chamber 50 (FIG. 4). A cross-sectional area of the set of turbulators 154 is greater than a cross-sectional area of the set of mini turbulators 162.

Referring to FIGS. 4-6, in operation, air A (FIG. 3) and fuel F are provided to the fuel nozzle body 102. Air A (FIG. 3) is split into multiple air streams illustrated as a first air stream A1 and a second air stream A2. The first air stream A1 flows from the air source through the first air supply passage 134. The second air stream A2 flows from the air source through the second air supply passage 136. That is, air A (FIG. 3) splits and flows through the first air supply passage 134 and the second air supply passage 136 towards the mixing section 144.

The first air stream A1 is unobstructed as it flows through the first air supply passage 134. That is, the first air stream A1 is an unobstructed air stream. As used herein, an unobstructed air stream refers to an air stream whose pressure or velocity changes by 5% or less along a length of the air supply passage through which the air stream flows. That is, from an upstream end of the first air supply passage 134 to a downstream end of the first air supply passage 134, the pressure and velocity of the first air stream A1 each change by 5% or less. Accordingly, the velocity and pressure of the first air stream A1 is generally consistent throughout the first air supply passage 134.

The second air stream A2 is partially obstructed by a flow impacting structure such as the orifice plate 140. The plurality of apertures 142 in the orifice plate 140 allows for the second air stream A2 to flow through the orifice plate 140. As a result of the second air stream A2 passing through the apertures 142 of the orifice plate 140, the second air stream A2 undergoes a pressure drop. That is, the pressure of the second air stream A2 is greater upstream of the orifice plate 140 compared to downstream of the orifice plate 140. As a result of the second air stream A2 passing through the apertures 142 of the orifice plate 140, the second air stream A2 undergoes a velocity increase. That is, the velocity of the second air stream A2 is lower upstream of the orifice plate 140 compared to downstream of the orifice plate 140.

The velocity of the second air stream A2 can be tuned or adjusted by increasing or decreasing the open area of the orifice plate 140. For example, a configuration of the orifice plate 140 including a relatively larger open area will produce a pressure drop of the second air stream A2 through the orifice plate 140 that is lower in magnitude compared to a configuration of the orifice plate 140 including a relatively smaller open area. Similarly, a configuration of the orifice plate 140 including a relatively larger open area will produce a velocity increase of the second air stream A2 through the orifice plate 140 that is lower in magnitude compared to a configuration of the orifice plate 140 including a relatively smaller open area.

At an upstream end of the first air supply passage 134 and the second air supply passage 136, a velocity the first air stream A1 is the same as a velocity of the second air stream A2. The first air stream A1 being unobstructed and the second air stream A2 being obstructed by the orifice plate 140 can result in the velocity of the first air stream A1 being different from a corresponding velocity of the second air stream A2 at a downstream end of the first air supply passage 134 and the second air supply passage 136 adjacent to the mixing section 144. For example, the velocity of the first air stream A1 divided by the velocity of the second air stream A2 can be in a range from greater than or equal to 1.05 and less than or equal to 1.5.

The first air supply passage 134 and the second air supply passage 136 converge towards the premixer centerline 104 as a result of the tapered portion 106 of the fuel nozzle body 102 and the tapered portion 128 of the first splitter 126. That is, a cross-sectional area of each of the first air supply passage 134 and the second air supply passage 136 measured perpendicularly to the premixer centerline 104 decreases from an upstream portion to a downstream portion of the premixer 100. The decrease in cross-sectional area of the first air supply passage 134 and the second air supply passage 136 causes acceleration of the first air stream A1 and the second air stream A2 flowing out of the first air supply passage 134 and the second air supply passage 136 towards the mixing section 144.

As the first air stream A1 is leaving the first air supply passage 134 flowing towards the mixing section 144, the first air stream A1 passes over the downstream terminal end the first splitter 126 illustrated as the first chevron shaped edge 138. Turbulators of the set of turbulators 154 are axially and radially staggered with respect to each other to turn the first air stream A1. That is, the first air stream A1 passing over the first chevron shaped edge 138 subsequently forms into major counter-rotating streamwise vortices in the mixing section 144. Similarly, mini turbulators of the set of mini turbulators 162 are axially and radially staggered with respect to each other to turn the first air stream A1. That is, the first air stream A1 passing over the first chevron shaped edge 138 including the set of mini turbulators 162 subsequently forms into minor counter-rotating streamwise vortices in the mixing section 144. Vortices generated by the set of turbulators 154 are a greater volume compared to vortices generated by the set of mini turbulators 162. Similarly, as the second air stream A2 is leaving the second air supply passage 136 flowing towards the mixing section 144, the second air stream A2 passes over the downstream terminal end of the first splitter 126, namely the first chevron shaped edge 138, and generates major and minor counter-rotating streamwise vortices.

The fuel F flows through the first fuel supply passage 122 from the fuel source 34 (FIG. 3). The fuel F then subsequently exits the first fuel supply passage 122 at the first fuel outlet 124, then flows into the mixing section 144.

Optionally, the fuel F or another fuel flows through the second fuel supply passage 146 into the mixing section 144. The second fuel supply passage 146 can provide the fuel F or another fuel at the second fuel outlet 148 in a direction offset or angled relative to the premixer centerline 104. The fuel post 150 directs flow of the fuel F or other fuel exiting the second fuel supply passage 146 towards the mixing section 144. The direction of fuel F or other fuel exiting the second fuel supply passage 146 by the fuel post 150 reduces risk of flashback and flameholding in the combustion chamber 50. Further, injecting fuel F through the second fuel supply passage 146 downstream of the first fuel outlet 124 aids in distributing flow within the mixing section 144.

The mixing section 144 is located downstream of the first fuel outlet 124 and upstream of the combustion chamber 50. The fuel F, the first air stream A1, and the second air stream A2 are mixed together in the mixing section 144 then provided as a fuel-air mixture M to the combustion chamber 50.

Since the orifice plate 140 is disposed within the second air supply passage 136 and the first air supply passage 134 is unobstructed, a velocity of the first air stream A1 as it enters the mixing section 144 can be different from a velocity of the second air stream A2 as it enters the mixing section 144. Counter-rotating vortices are generated by the first air stream A1 and the second air stream A2 passing over the first chevron shaped edge 138. The combination of the differing velocities of the first air stream A1 and the second air stream A2 with the formation of counter-rotating vortices of the first air stream A1 and the second air stream A2 results in turbulence and effective mixing of fuel F and air A in the mixing section 144. By providing an effectively mixed fuel-air mixture M to the combustion chamber 50, flame holding and flashback are prevented. Further, providing an effectively mixed fuel-air mixture M to the combustion chamber also aids in shaping a combustion flame. Furthermore, providing an effectively mixed fuel-air mixture M to the combustion chamber 50 can ultimately lower $NO_x$ emissions.

Figure 7:
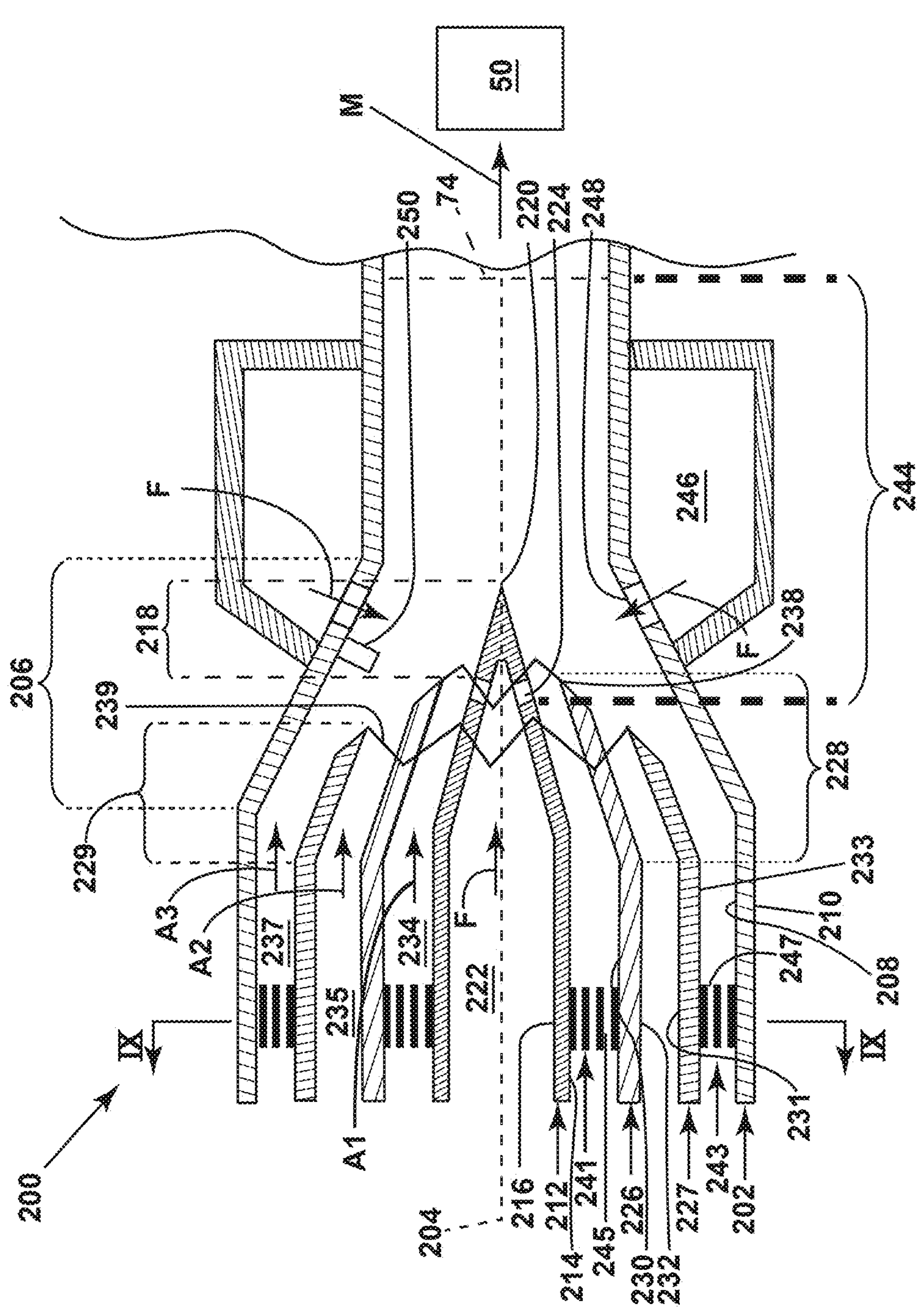
FIG. 7 is a variation of the fuel nozzle assembly of FIG. 3 in accordance with various aspects described herein.

FIG. 7 depicts another exemplary premixer 200 suitable for use as the premixer 72 of FIG. 3. The premixer 200 is similar to the premixer 100; therefore, like parts are identified with like numerals increased to the 200 series, with it being understood that the description of the premixer 100 applies to the premixer 200 unless noted otherwise.

The premixer 200 is defined in part by a fuel nozzle body 202 of the fuel nozzle assembly 48 (FIG. 3). The fuel nozzle body 202 defines a premixer centerline 204 and can include a tapered portion 206 that converges towards the premixer centerline 104. The fuel nozzle body 202 includes an inner fuel nozzle body surface 208 and an outer fuel nozzle body surface 210, the inner fuel nozzle body surface 208 being located radially inward of the outer fuel nozzle body surface 210 with respect to the premixer centerline 204. A mixing section 244 is defined by the inner fuel nozzle body surface 208 confronting the combustion chamber 50 at a downstream end of the fuel nozzle body 202.

A centerbody 212 is spaced from and circumscribed by the fuel nozzle body 202. The centerbody 212 includes an outer centerbody surface 214 and an inner centerbody surface 216, the inner centerbody surface 216 being located radially inward of the outer centerbody surface 214 with respect to the premixer centerline 204. The centerbody 212 also includes a tapered nose portion 218 that is tapered to a downstream terminal end 220 confronting the combustion chamber 50. The inner centerbody surface 216 defines a first fuel supply passage 222. An upstream portion of the first fuel supply passage 222 is fluidly connected to the fuel source 34 (FIG. 3). At least one through hole, illustrated as a first fuel outlet 224, is located at the tapered nose portion 218 and extends through the centerbody 212 from the outer centerbody surface 214 to the inner centerbody surface 216.

At least one annularly shaped splitter, illustrated in FIG. 7 as a first splitter 226 analogous to the first splitter 126 of FIGS. 4 and 5, and a second splitter 227, is located between the inner fuel nozzle body surface 208 and the outer centerbody surface 214. That is, at least part of the centerbody 212 is circumscribed by the first splitter 226, at least part of the first splitter is circumscribed by the second splitter 227, and at least part of the second splitter 227 is circumscribed by the inner fuel nozzle body surface 208.

A downstream portion the first splitter 226 can include a tapered portion 228 that converges towards the centerbody 212 or the premixer centerline 204. A downstream portion of the second splitter can include a tapered portion 229 that converges towards the centerbody 212 or the premixer centerline 204. That is, a cross-sectional area of the first splitter 226 measured in a direction perpendicular to the premixer centerline 204 and a cross-sectional area of the second splitter 227 measured in a direction perpendicular to the premixer centerline 204 decrease from an upstream portion to a downstream portion of the premixer 200. The tapered portion 228 of the first splitter 226 and the tapered portion 229 of the second splitter 227 can be parallel or non-parallel with each other. Additionally or alternatively, either or both of the tapered portion 228 of the first splitter 226 and the tapered portion 229 of the second splitter 227 can be parallel or non-parallel with the tapered portion 206 of the fuel nozzle body 202. The tapered portion 206 of the fuel nozzle body 202 can axially overlap at least a portion of the tapered portion 228 of the first splitter 226. Additionally or alternatively, the tapered portion 206 of the fuel nozzle body 202 can axially overlap at least a portion of the tapered portion 229 of the second splitter 227.

The first splitter 226 includes an inner first splitter surface 230 and an outer first splitter surface 232, the inner first splitter surface 230 being located radially inward of the outer first splitter surface 232 with respect to the premixer centerline 204. The second splitter 227 includes an inner second splitter surface 231 and an outer second splitter surface 233, the inner second splitter surface 231 being located radially inward of the outer second splitter surface 233 with respect to the premixer centerline 204. The inner first splitter surface 230 is spaced from and can optionally confront the outer centerbody surface 214. The outer first splitter surface 232 is spaced from and can optionally confront the inner second splitter surface 231. The outer second splitter surface 233 is spaced from and can optionally confront the inner fuel nozzle body surface 208.

A first air supply passage 234 is defined by the outer centerbody surface 214 and the inner first splitter surface 230. In other words, a first air stream A1 flows through an annular passage defined by the outer centerbody surface 214 and the inner first splitter surface 230. A second air supply passage 235 is defined by the outer first splitter surface 232 and the inner second splitter surface 231. In other words, a second air stream A2 flows through an annular passage defined by the outer first splitter surface 232 and the inner second splitter surface 231. A third air supply passage 237 is defined by the outer second splitter surface 233 and the inner fuel nozzle body surface 208. In other words, a third air stream A3 flows through an annular passage defined by outer second splitter surface 233 and the inner fuel nozzle body surface 208. The configuration of the first air supply passage 234, the second air supply passage 235, and the third air supply passage 237 results in the second air supply passage 235 circumscribing the first air supply passage 234, and the third air supply passage 237 circumscribing the second air supply passage 235.

The tapered portion 228 of the first splitter 226 terminates at a shaped edge illustrated as a first chevron shaped edge 238. The first chevron shaped edge 238 is located at a downstream terminal end of the first splitter 226. Additionally or alternatively, the tapered portion 229 of the second splitter 227 terminates at a shaped edge illustrated as a second chevron shaped edge 239. The second chevron shaped edge 239 is located at a downstream terminal end of the second splitter 227. The first chevron shaped edge 238 and correspondingly the downstream terminal end of the first splitter 226 can be located downstream, or closer to the combustion chamber 50, than the second chevron shaped edge 239 and correspondingly the downstream terminal end of the second splitter 227. The particular shape of either or both the first chevron shaped edge 238 and the second chevron shaped edge 239 can be the shape illustrated by FIG. 6 optionally including a set of turbulators 154 (FIG. 6) and a set of mini turbulators 162 (FIG. 6).

At least one orifice plate can be located in an air supply passage. As illustrated, by way of example, a first orifice plate 241 is located within the first air supply passage 234, and a second orifice plate 243 is located within the third air supply passage 237. Although the first orifice plate 241 and the second orifice plate 243 are illustrated as overlapping axially, it is contemplated that in a different and non-limiting example, the first orifice plate 241 and the second orifice plate 243 can be axially offset from each other. That is, the first orifice plate 241 can be located further away from the combustion chamber 50 than the second orifice plate 243 or the first orifice plate 241 can be located closer to the combustion chamber 50 than the second orifice plate 243. Additionally or alternatively, the first orifice plate 241 can be located further upstream within the fuel nozzle body 202 than the second orifice plate 243, or the second orifice plate 243 can be located further upstream within the fuel nozzle body 202.

While the at least one orifice plate is illustrated as two orifice plates, namely the first orifice plate 241 and the second orifice plate 243, it is contemplated, in a different and non-limiting example, that the at least one orifice plate is one orifice plate located within first air supply passage 234, the second air supply passage 235, or the third air supply passage 237. Additionally, or alternatively, the at least one orifice plate can include more than two orifice plates each being disposed within one of the first air supply passage 234, the second air supply passage 235, or the third air supply passage 237 such that each of the first air supply passage 234, the second air supply passage 235, and the third air supply passage 237 include therein an orifice plate. A plurality of first apertures 245 extend through the first orifice plate 241. A plurality of second apertures 247 extend through the second orifice plate 243.

Optionally, in addition to the first fuel supply passage 222, the fuel nozzle body 202 can include or couple to a second fuel supply passage 246. The second fuel supply passage 246 fluidly couples a fuel source (e.g., fuel source 34, FIGS. 2-3, or another fuel source) to a second fuel outlet 248. Optionally, a fuel post 250 can extend from the inner fuel nozzle body surface 208 towards the premixer centerline 204. Injecting fuel F through the second fuel supply passage 246 downstream of the first fuel outlet 224 aids in distributing flow within the mixing section 244.

Figure 8:
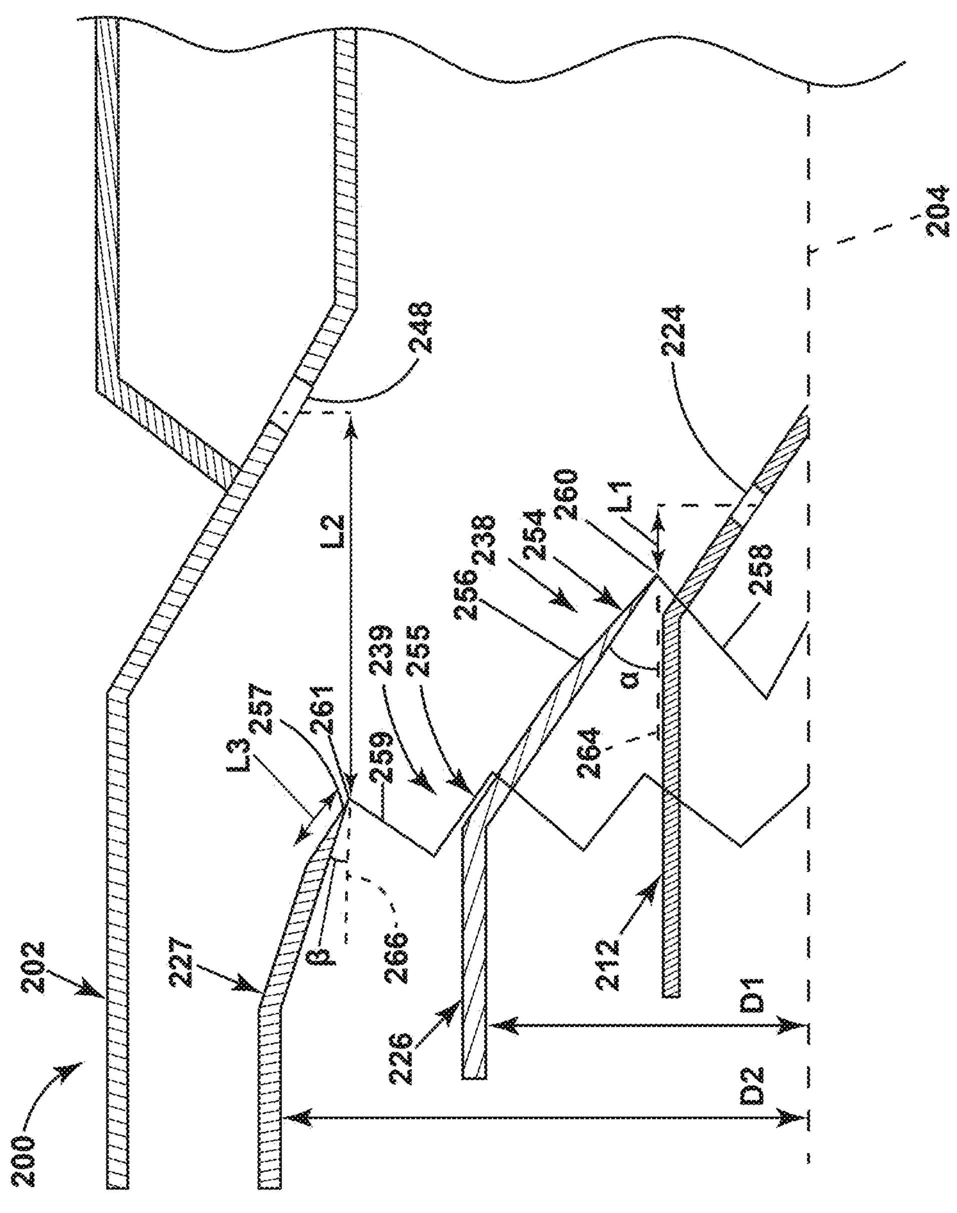
FIG. 8 illustrates an enlarged portion of FIG. 7 further illustrating a fuel nozzle body, splitters, and a centerbody in accordance with various aspects described herein.

FIG. 8 illustrates an enlarged portion of FIG. 7 further illustrating a spacing arrangement of the premixer 200. The first splitter 226 circumscribes the centerbody 212. The first splitter 226 is located a first distance D1 from the premixer centerline 204 measured perpendicularly to the premixer centerline 204. The first splitter 226 includes the first chevron shaped edge 238. The first chevron shaped edge 238 includes a first set of first turbulators 254. The number of first turbulators of the plurality of first turbulators 254 can be at least two. In a non-limiting example, the number of first turbulators of the plurality of first turbulators 254 can be from two to ten. Each first turbulator of the set of first turbulators 254 is formed in a triangle shape including a first turbulator first edge 256 and a first turbulator second edge 258. The first turbulator first edge 256 and the first turbulator second edge 258 converge at a first turbulator major peak 260 confronting the combustion chamber 50 (FIG. 7). A first length L1 can be measured in a direction parallel to the premixer centerline 204 from a first turbulator major peak 260 to a center of the first fuel outlet 224. In a non-limiting example, the first length L1 can be in a range from 0.1 to 3 of the first distance D1. In other words, the first length L1 can be related to the first distance D1 in a range from greater than or equal to 0.1*D1 to less than or equal to 3*D1.

The second splitter 227 circumscribes the first splitter 226. The second splitter 227 is circumscribed by the fuel nozzle body 202. The second splitter 227 is located a distance D2 from the premixer centerline 204 measured perpendicularly to the premixer centerline 204. The second splitter 227 includes the second chevron shaped edge 239. The second chevron shaped edge 239 includes a set of second turbulators 255. The number of second turbulators of the set of second turbulators 255 can be at least two. In a non-limiting example, the number of second turbulators of the set of second turbulators 255 can be from two to ten. Each second turbulator of the set of first turbulators 254 is formed in a triangle shape including a second turbulator first edge 257 and a second turbulator second edge 259. The second turbulator first edge 257 and the second turbulator second edge 259 converge at a second turbulator major peak 261 confronting the combustion chamber 50 (FIG. 7). A second length L2 can be measured in a direction parallel to the premixer centerline 204 from the second turbulator major peak 261 to a center of the second fuel outlet 248. In a non-limiting example, the second length L2 can be in a range from 0.1 to 3 of the second distance D2. In other words, the second length L2 can be related to the second distance D2 in a range from greater than or equal to 0.1*D2 to less than or equal to 3*D2.

A third length, L3, is defined as the length of the first turbulator first edge 256, first turbulator second edge 258, the second turbulator first edge 257, or the second turbulator second edge 259. In a non-limiting example, the third length L3 can be related to the first distance D1 and the second distance D2, ranging from 0.1*D1 to D1/D2. In other words, the third length L3 can be related to the first distance D1 and the second distance D2 in a range from greater than or equal to 0.1*D1 and less than or equal to D1/D2. A first angle α is defined between a first reference line 264 and either the first turbulator first edge 256 or the first turbulator second edge 258. The first reference line 264 originates at the first turbulator major peak 260 and extends parallel to the premixer centerline 204 away from the combustion chamber 50 (FIG. 7). The value of α can, in a non-limiting example, be in a range from 5° to 60°. A second angle β is defined between a second reference line 266 and either the second turbulator first edge 257 or the second turbulator second edge 259. The second reference line 266 originates at the second turbulator major peak 261 and extends parallel to the premixer centerline 204 away from the combustion chamber 50 (FIG. 7). The value of β can, in a non-limiting example, be in a range from 5° to 60°.

Figure 9:
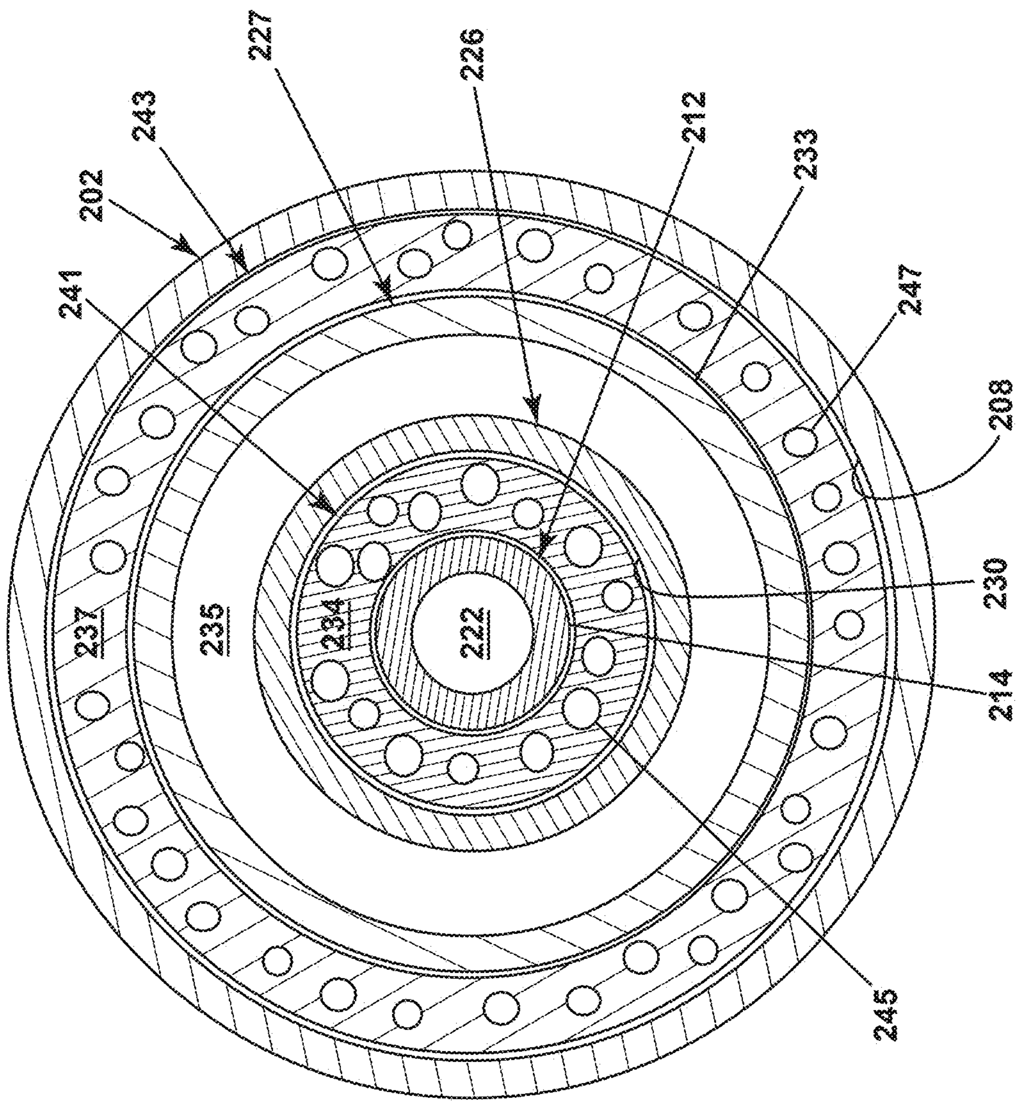
FIG. 9 is a schematic cross-sectional view of a portion of the premixer of FIG. 7 along line IX-IX showing details of an orifice plate in accordance with various aspects described herein.

FIG. 9 illustrates a cross-sectional view of the premixer 200 along line IX-IX from FIG. 7. The centerbody 212 defines the first fuel supply passage 222. The first splitter 226 together with the centerbody 212 defines the first air supply passage 234. The first splitter 226 together with the second splitter 227 defines the second air supply passage 235. The second splitter 227 together with the fuel nozzle body 202 defines the third air supply passage 237. Although a gap is illustrated between the first orifice plate 241 and inner first splitter surface 230 and a gap is illustrated between the first orifice plate 241 and the outer centerbody surface 214, in a different and non-limiting example, a portion of or all of the first orifice plate 241 is in direct contact with either or both of the inner first splitter surface 230 and the outer centerbody surface 214. Although a gap is illustrated between the second orifice plate 243 and inner fuel nozzle body surface 208 and a gap is illustrated between the second orifice plate 243 and outer second splitter surface 233, in a different and non-limiting example, a portion of or all of the second orifice plate 243 is in direct contact with either or both of the inner fuel nozzle body surface 208 and the outer second splitter surface 233.

The first orifice plate 241 includes the plurality of first apertures 245. The second orifice plate 243 includes a plurality of second apertures 247. The plurality of first apertures 245 and the plurality of second apertures 247 can be any shape that can create a pressure drop when gas, such as air A, flows therethrough. In non-limiting examples, the shape of the plurality of first apertures 245 and the plurality of second apertures 247 can include circles as shown. Additionally, or alternatively, the shape of the plurality of first apertures 245 and the plurality of second apertures 247 can include elongated circles, ovals, polygons such as squares, rectangles, pentagons, or trapezoids, or a combination thereof.

The plurality of first apertures 245 collectively defines a porosity or an open area of the first orifice plate 241 through which air A can pass. The plurality of second apertures 247 defines a porosity or an open area of the second orifice plate 243. The plurality of first apertures 245 can include any number of first apertures and the plurality of second apertures 247 can include any number of second apertures. Additionally, or alternatively, the cross-sectional area of each first aperture of the plurality of first apertures 245 and the cross-sectional area of each second aperture of the plurality of second apertures 247 can vary. Although the plurality of first apertures 245 are depicted around the entire first orifice plate 241, additionally or alternatively still, the plurality of first apertures 245 can be located in only part of the first orifice plate 241. Although the plurality of second apertures 247 are depicted around the entire second orifice plate 243, additionally or alternatively still, the plurality of second apertures 247 can be located in only part of the second orifice plate 243.

It will be appreciated that increasing the open area of the first orifice plate 241 can be achieved by increasing the number of the plurality of first apertures 245, increasing the size of some or all of the plurality of first apertures 245, decreasing the interspatial distance between adjacent first apertures of the plurality of first apertures 245, or a combination thereof. Conversely, it will be appreciated that decreasing the open area of the first orifice plate 241 can be achieved by decreasing the number of the plurality of first apertures 245, decreasing the size of some or all of the plurality of first apertures 245, increasing the interspatial distance between adjacent first apertures of the plurality of first apertures 245, or a combination thereof.

Similarly, it will be appreciated that increasing the open area of the second orifice plate 243 can be achieved by increasing the number of the plurality of second apertures 247, increasing the size of some or all of the plurality of second apertures 247, decreasing the interspatial distance between adjacent second apertures of the plurality of second apertures 247, or a combination thereof. Conversely, it will be appreciated that decreasing the open area of the second orifice plate 243 can be achieved by decreasing the number of the plurality of second apertures 247, decreasing the size of some or all of the plurality of second apertures 247, increasing the interspatial distance between adjacent second apertures of the plurality of second apertures 247, or a combination thereof. In some examples, the porosity or open area of the first orifice plate 241 can be in a range from greater than or equal to 20% and less than or equal to 80% of a total area of the first orifice plate 241. In some examples, the porosity or open area of the second orifice plate 243 can be in a range from greater than or equal to 20% and less than or equal to 80% of a total area of the second orifice plate 243.

Referring to FIGS. 7-9, in operation, air A (FIG. 3) and fuel F are provided to the fuel nozzle body 202. Air A (FIG. 3) is split into multiple air streams illustrated as a first air stream A1, a second air stream A2, and a third air stream A3. The first air stream A1 flows from the air source through the first air supply passage 234. The second air stream A2 flows from the air source through the second air supply passage 235. The third air stream A3 flows from the air source through the third air supply passage 237. That is, air A (FIG. 3) splits and flows through the first air supply passage 234, the second air supply passage 235, and the third air supply passage 237 towards the mixing section 244.

The second air stream A2 is unobstructed as it flows through the second air supply passage 235. That is, the second air stream A2 is an unobstructed air stream. Accordingly, the velocity and pressure of the second air stream A2 are both generally consistent throughout the second air supply passage 235.

The first air stream A1 is partially obstructed by a flow impacting structure such as the first orifice plate 241. The plurality of first apertures 245 in the first orifice plate 241 allows for the first air stream A1 to flow through the first orifice plate 241. As a result of the first air stream A1 passing through the first apertures 245 of the first orifice plate 241, the first air stream A1 undergoes a pressure drop. That is, the pressure of the first air stream A1 is greater upstream of the first orifice plate 241 compared to downstream of the first orifice plate 241. As a result of the first air stream A1 passing through the first apertures 245 of the first orifice plate 241, the first air stream A1 undergoes a velocity increase. That is, the velocity of the first air stream A1 is lower upstream of the first orifice plate 241 compared to downstream of the first orifice plate 241. The particular amount of velocity increase and pressure drop of the first air stream A1 across the first orifice plate 241 can be tuned or adjusted by increasing or decreasing the open area of the first orifice plate 241 as described earlier with respect to the orifice plate 140 (FIGS. 4-6).

The third air stream A3 is partially obstructed by a flow impacting structure such as the second orifice plate 243. The plurality of second apertures 247 in the second orifice plate 243 allows for the third air stream A3 to flow through the second orifice plate 243. As a result of the third air stream A3 passing through the second apertures 247 of the second orifice plate 243, the first air stream A3 undergoes a pressure drop. That is, the pressure of the third air stream A3 is greater upstream of the second orifice plate 243 compared to downstream of the second orifice plate 243. As the third air stream A3 passes through the second apertures 247 of the second orifice plate 243, the third air stream A3 undergoes a velocity increase. That is, the velocity of the third air stream A3 is lower upstream of the second orifice plate 243 compared to downstream of the second orifice plate 243. The particular amount of velocity increase and pressure drop across the second orifice plate 243 of the third air stream A3 can be tuned or adjusted by increasing or decreasing the open area of the second orifice plate 243 as described earlier with respect to the orifice plate 140 (FIGS. 4-6).

The first orifice plate 241 and the second orifice plate 243 are responsible for between greater than or equal to 0% and less than or equal to 80% of the total pressure drop of the first air stream A1, the second air stream A2, and the third air stream A3. For example, the first orifice plate 241 and the second orifice plate 243 are responsible for between greater than or equal to 10% and less than or equal to 80% of the total pressure drop of the first air stream A1, the second air stream A2, and the third air stream A3. At an upstream end of the first air supply passage 234, the second air supply passage 235, and the third air supply passage 237, a velocity the first air stream A1, a velocity of the second air stream A2, and a velocity of the third air stream A3 are each the same. The second air stream A2 being unobstructed and each of the first air stream A1 and the third air stream A3 being partially obstructed by the first orifice plate 241 and the second orifice plate 243, respectively, can result in the velocity of the second air stream A2 being greater than the velocity of the first air stream A1 and the third air stream A3 at a downstream end of the first air supply passage 234, the second air supply passage 235, and the third air supply passage 237 adjacent to the mixing section 144.

The first air supply passage 234, the second air supply passage 235, and the third air supply passage 237 each converge towards the premixer centerline 204 as a result of the tapered portion 206 of the fuel nozzle body 202, the tapered portion 228 of the first splitter 226, and the tapered portion 229 of the second splitter 227, respectively. That is, a cross-sectional area of each of the first air supply passage 234, the second air supply passage 235, and the third air supply passage 237 measured perpendicularly to the premixer centerline 204 decreases from an upstream portion to a downstream portion of the premixer 200. The decrease in cross-sectional area of the first air supply passage 234, the second air supply passage 235, and the third air supply passage 237 causes acceleration of the first air stream A1 flowing out of the first air supply passage 234 towards the mixing section 244, the second air stream A2 flowing out of the second air supply passage 235 towards the mixing section 244, and the third air stream A3 flowing out of the third air supply passage 237 towards the mixing section 244.

As the third air stream A3 is leaving the third air supply passage 237, the third air stream A3 passes over the downstream terminal end of the second splitter 227 illustrated as the second chevron shaped edge 239 forming counter-rotating vortices of the third air stream A3. As the second air stream A2 is leaving the second air supply passage 235, the second air stream A2 passes over the downstream terminal end of the second splitter 227 illustrated as the second chevron shaped edge 239 forming counter-rotating vortices of the second air stream A2. The counter-rotating vortices formed by the second air stream A2 and the counter-rotating vortices formed by the third air stream A3 begin to mix downstream of the second chevron shaped edge 239 and forming a partially mixed flow of the second air stream A2 and the third air stream A3. Subsequently, the partially mixed flow of the second air stream A2 and the third air stream A3 passes over the downstream terminal end of the first splitter 226 illustrated as the first chevron shaped edge 238, forming into further counter-rotating vortices formed by the partially mixed flow of the second air stream A2 and the third air stream A3 in the mixing section 244. As the first air stream A1 is leaving the first air supply passage 234 flowing towards the mixing section 244, the first air stream A1 passes over the downstream terminal end the first splitter 226 illustrated as the first chevron shaped edge 238 forming counter-rotating vortices in the mixing section 244. The counter-rotating vortices formed by the partially mixed flow of the second air stream A2 and the third air stream A3 mix with the counter-rotating vortices formed by the first air stream A1 in the mixing section 244.

The fuel F flows through the first fuel supply passage 222 from the fuel source 34 (FIG. 3). The fuel F then subsequently exits the first fuel supply passage 222 at the first fuel outlet 224, then flows into the mixing section 244.

Optionally, the fuel F or another fuel flows through the second fuel supply passage 246 into the mixing section 244. The second fuel supply passage 246 can provide the fuel F or another fuel at the second fuel outlet 248 in a direction offset or angled relative to the premixer centerline 204. The fuel post 250 directs flow of the fuel F or other fuel exiting the second fuel supply passage 246 towards the mixing section 244. The direction of fuel F or other fuel exiting the second fuel supply passage 246 by the fuel post 250 reduces risk of flashback and flameholding in the combustion chamber 50.

The mixing section 244 is located downstream of the first fuel outlet 224 and upstream of the combustion chamber 50. The fuel F, the first air stream A1, the second air stream A2, and the third air stream A3 are mixed together in the mixing section 244 then provided as a fuel-air mixture M to the combustion chamber 50.

Since the first orifice plate 241 is disposed within the first air supply passage 234, the second orifice plate 243 is disposed within the third air supply passage 237 and the second air supply passage 235 is unobstructed, a velocity of at least one of the first air stream A1 as it enters the mixing section 244 and the third air stream A3 as it enters the mixing section 244 can be different from a velocity of the second air stream A2 as it enters the mixing section 244. For example, the first air stream A1 and the third air stream A3 can have similar velocities to each other but can have a different velocity from the second air stream A2. Alternatively, each of the first air stream A1, the second air stream A2, and the third air stream A3 can have a different velocity entering the mixing section 244. The differing velocities of the first air stream A1, the second air stream A2, and the third air stream A3 causes shear layers to form between air streams which will have high velocity gradients.

Counter-rotating vortices are generated by the first air stream A1 and the second air stream A2 passing over the first chevron shaped edge 238 and the second chevron shaped edge 239, respectively. The combination of the differing velocities of the first air stream A1, the second air stream A2, and the third air stream A3 with the formation of counter-rotating vortices of the first air stream A1 and the second air stream A2 results in turbulence and effective mixing of fuel F and air A in the mixing section 244. By providing an effectively mixed fuel-air mixture M to the combustion chamber 50, flame holding and flashback are prevented. Further, providing an effectively mixed fuel-air mixture M to the combustion chamber also aids in shaping a combustion flame. Furthermore, providing an effectively mixed fuel-air mixture M to the combustion chamber 50 can ultimately lower $NO_x$ emissions.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a compressor section, a combustion section, and a turbine section in serial flow arrangement, with the combustion section comprising a combustion chamber and a fuel nozzle assembly fluidly coupled with the combustion chamber at a fuel nozzle assembly outlet, wherein the fuel nozzle assembly comprises a centerbody having an outer surface and a nose confronting the combustion chamber, a gaseous fuel supply passage located within the centerbody and having at least one gaseous fuel outlet on the outer surface of the centerbody emitting a gaseous fuel, and a plurality of air supply passages circumscribing the centerbody, including at least a first air supply passage and a second air supply passage circumscribing the first air supply passage with one of the first air supply passage or the second air supply passage emitting air at a lower velocity than the other of the first air supply passage or the second air supply passage to generate a set of vortices circumscribing the gaseous fuel emitted from the gaseous fuel outlet.

The turbine engine of any preceding clause, wherein the fuel nozzle assembly is a gaseous fuel nozzle assembly.

The turbine engine of any preceding clause, wherein the fuel nozzle assembly further comprises at least one splitter having an annular shape circumscribing the centerbody and separating adjacent air supply passages of the plurality of air supply passages.

The turbine engine of any preceding clause, wherein the fuel nozzle assembly includes a fuel nozzle body circumscribing the centerbody and the plurality of air supply passages.

The turbine engine of any preceding clause, wherein at least one of the first air supply passage and the second air supply passage includes an orifice plate partially obstructing a flow of air therethrough.

The turbine engine of any preceding clause, wherein at least one of the fuel nozzle body or the at least one splitter converge toward the centerbody upstream of the fuel nozzle assembly outlet.

A turbine engine, comprising a compressor section, a combustion section, and a turbine section in serial flow arrangement, with the combustion section comprising a combustion chamber and a fuel nozzle assembly fluidly coupled with the combustion chamber at a fuel nozzle assembly outlet, wherein the fuel nozzle assembly comprises a gaseous fuel passage defined by an inner surface of a centerbody, a plurality of annularly shaped air supply passages circumscribing the centerbody including at least a first air supply passage and a second air supply passage circumscribing the first air supply passage, at least one splitter having an annular shape circumscribing the centerbody and separating adjacent air supply passages of the plurality of air supply passages, a fuel nozzle body circumscribing the plurality of air supply passages and the at least one splitter, and at least one orifice plate disposed within one of the plurality of air supply passages.

The turbine engine of any preceding clause, wherein a downstream terminal end of the at least one splitter is disposed downstream of the at least one orifice plate and upstream of the fuel nozzle assembly outlet.

The turbine engine of any preceding clause, wherein the downstream terminal end of the at least one splitter includes a chevron shaped portion including a set of triangle shaped turbulators each having a first edge and a second edge that converge at a major peak pointing towards the fuel nozzle assembly outlet and the combustion chamber.

The turbine engine of any preceding clause, wherein at least one turbulator of the set of turbulators further includes a set of triangle shaped mini turbulators each having a smaller cross-sectional area than that of the turbulators and a minor peak pointing towards the fuel nozzle assembly outlet and the combustion chamber.

The turbine engine of any preceding clause, wherein the gaseous fuel passage defined by the inner surface of a centerbody of the fuel nozzle body is a first gaseous fuel supply passage, and the fuel nozzle body further includes a second gaseous fuel outlet of a second gaseous fuel supply passage disposed downstream of the at least one splitter.

The turbine engine of any preceding clause, wherein the fuel nozzle assembly further includes a fuel post protruding from the fuel nozzle body upstream of the second gaseous fuel outlet.

The turbine engine of any preceding clause, wherein the at least one orifice plate is an annular shape and includes a plurality of apertures.

The turbine engine of any preceding clause, wherein the plurality of apertures are shaped as circles, polygons, or a combination thereof.

The turbine engine of any preceding clause, wherein the at least one orifice plate is disposed within the second air supply passage.

The turbine engine of any preceding clause, wherein the at least one orifice plate is a plurality of orifice plates and each of the plurality of air supply passages includes an orifice plate of the plurality of orifice plates disposed therein.

The turbine engine of any preceding clause, wherein the plurality of air supply passages further includes at least a third air supply passage circumscribing the second air supply passage, and the at least one splitter is at least a first splitter separating the first air supply passage and the second air supply passage, and a second splitter separating the second air supply passage and the third air supply passage.

The turbine engine of any preceding clause, wherein the at least one orifice plate includes at least a first orifice plate disposed within the first air supply passage and a second orifice plate disposed within the third air supply passage.

The turbine engine of any preceding clause, wherein the second air supply passage does not include an orifice plate.

The turbine engine of any preceding clause, wherein a downstream terminal end of the first splitter is disposed closer to the combustion chamber than a downstream terminal end of the second splitter.

The turbine engine of any preceding clause, wherein the nose of the centerbody includes a tapered portion that is tapered to a downstream terminal end of the centerbody confronting the combustion chamber.

The turbine engine of any preceding clause, wherein an interspatial distance between adjacent apertures of the plurality of apertures is be equal, non-equal, or a combination thereof.

The turbine engine of any preceding clause, wherein the first splitter includes a first chevron shaped edge including a plurality of first turbulators.

The turbine engine of any preceding clause, wherein the number of first turbulators of the plurality of first turbulators is in a range from greater than or equal to two and less than or equal to ten.

The turbine engine of any preceding clause, wherein the second splitter includes a second chevron shaped edge including a plurality of second turbulators.

The turbine engine of any preceding clause, wherein the number of second turbulators of the plurality of second turbulators is in a range from greater than or equal to two and less than or equal to ten.

A fuel nozzle assembly comprising a centerbody having an outer surface and a nose, a gaseous fuel supply passage located within the centerbody and having at least one gaseous fuel outlet on the outer surface of the centerbody emitting a gaseous fuel, and a plurality of air supply passages circumscribing the centerbody, including at least a first air supply passage and a second air supply passage circumscribing the first air supply passage with one of the first air supply passage or the second air supply passage emitting air at a lower velocity than the other of the first air supply passage or the second air supply passage to generate a set of vortices circumscribing the gaseous fuel emitted from the gaseous fuel outlet.

A fuel nozzle assembly having a fuel nozzle assembly outlet, wherein the fuel nozzle assembly comprises a gaseous fuel passage defined by an inner surface of a centerbody, a plurality of annularly shaped air supply passages circumscribing the centerbody including at least a first air supply passage and a second air supply passage circumscribing the first air supply passage, at least one splitter having an annular shape circumscribing the centerbody and separating adjacent air supply passages of the plurality of air supply passages, a fuel nozzle body circumscribing the plurality of air supply passages and the at least one splitter, and at least one orifice plate disposed within one of the plurality of air supply passages.

The fuel nozzle assembly of any preceding clause, wherein the fuel nozzle assembly is a gaseous fuel nozzle assembly.

The fuel nozzle assembly of any preceding clause, wherein the fuel nozzle assembly further comprises at least one splitter having an annular shape circumscribing the centerbody and separating adjacent air supply passages of the plurality of air supply passages.

The fuel nozzle assembly of any preceding clause, wherein the fuel nozzle assembly includes a fuel nozzle body circumscribing the centerbody and the plurality of air supply passages.

The fuel nozzle assembly of any preceding clause, wherein at least one of the first air supply passage and the second air supply passage includes an orifice plate partially obstructing a flow of air therethrough.

The fuel nozzle assembly of any preceding clause, wherein at least one of the fuel nozzle body or the at least one splitter converge toward the centerbody upstream of the fuel nozzle assembly outlet.

The fuel nozzle assembly of any preceding clause, wherein a downstream terminal end of the at least one splitter is disposed downstream of the at least one orifice plate and upstream of the fuel nozzle assembly outlet.

The fuel nozzle assembly of any preceding clause, wherein the downstream terminal end of the at least one splitter includes a chevron shaped portion including a set of triangle shaped turbulators each having a first edge and a second edge that converge at a major peak pointing towards the fuel nozzle assembly outlet and the combustion chamber.

The fuel nozzle assembly of any preceding clause, wherein at least one turbulator of the set of turbulators further includes a set of triangle shaped mini turbulators each having a smaller cross-sectional area than that of the turbulators and a minor peak pointing towards the fuel nozzle assembly outlet and the combustion chamber.

The fuel nozzle assembly of any preceding clause, wherein the gaseous fuel passage defined by the inner surface of a centerbody of the fuel nozzle body is a first gaseous fuel supply passage, and the fuel nozzle body further includes a second gaseous fuel outlet of a second gaseous fuel supply passage disposed downstream of the at least one splitter.

The fuel nozzle assembly of any preceding clause, wherein the fuel nozzle assembly further includes a fuel post protruding from the fuel nozzle body upstream of the second gaseous fuel outlet.

The fuel nozzle assembly of any preceding clause, wherein the at least one orifice plate is an annular shape and includes a plurality of apertures.

The fuel nozzle assembly of any preceding clause, wherein the plurality of apertures are shaped as circles, polygons, or a combination thereof.

The fuel nozzle assembly of any preceding clause, wherein the at least one orifice plate is disposed within the second air supply passage.

The fuel nozzle assembly of any preceding clause, wherein the at least one orifice plate is a plurality of orifice plates and each of the plurality of air supply passages includes an orifice plate of the plurality of orifice plates disposed therein.

The fuel nozzle assembly of any preceding clause, wherein the plurality of air supply passages further includes at least a third air supply passage circumscribing the second air supply passage, and the at least one splitter is at least a first splitter separating the first air supply passage and the second air supply passage, and a second splitter separating the second air supply passage and the third air supply passage.

The fuel nozzle assembly of any preceding clause, wherein the at least one orifice plate includes at least a first orifice plate disposed within the first air supply passage and a second orifice plate disposed within the third air supply passage.

The fuel nozzle assembly of any preceding clause, wherein the second air supply passage does not include an orifice plate.

The fuel nozzle assembly of any preceding clause, wherein a downstream terminal end of the first splitter is disposed closer to the combustion chamber than a downstream terminal end of the second splitter.

What is claimed is:

1. A turbine engine, comprising:
- a compressor section, a combustion section, and a turbine section in serial flow arrangement, with the combustion section comprising:
- a combustion chamber; and
- a fuel nozzle assembly fluidly coupled with the combustion chamber at a fuel nozzle assembly outlet, wherein the fuel nozzle assembly comprises:
  - a centerbody having an outer surface and a nose confronting the combustion chamber;
  - a gaseous fuel supply passage located within the centerbody and having at least one gaseous fuel outlet including a first gaseous fuel outlet on the outer surface of the centerbody emitting a gaseous fuel;
  - a plurality of air supply passages circumscribing the centerbody, including at least a first air supply passage and a second air supply passage circumscribing the first air supply passage with one of the first air supply passage or the second air supply passage emitting air at a lower velocity than the other of the first air supply passage or the second air supply passage to generate a set of vortices circumscribing the gaseous fuel emitted from the first gaseous fuel outlet,
  - at least one splitter configured to separate at least two air supply passages of the plurality of air supply passages; and
  - a second gaseous fuel outlet disposed downstream of the at least one splitter and the first gaseous fuel outlet.

2. The turbine engine of claim 1, wherein the fuel nozzle assembly is a gaseous fuel nozzle assembly.

3. The turbine engine of claim 1, wherein the fuel nozzle assembly further comprises the at least one splitter having an annular shape circumscribing the centerbody.

4. The turbine engine of claim 3, wherein the fuel nozzle assembly includes a fuel nozzle body circumscribing the centerbody and the plurality of air supply passages.

5. The turbine engine of claim 4, wherein at least one of the first air supply passage and the second air supply passage includes an orifice plate partially obstructing a flow of air therethrough.

6. The turbine engine of claim 5, wherein at least one of the fuel nozzle body or the at least one splitter converge toward the centerbody upstream of the fuel nozzle assembly outlet.

7. A turbine engine, comprising:
- a compressor section, a combustion section, and a turbine section in serial flow arrangement, with the combustion section comprising:
- a combustion chamber; and
- a fuel nozzle assembly fluidly coupled with the combustion chamber at a fuel nozzle assembly outlet, wherein the fuel nozzle assembly comprises:
  - a first gaseous fuel passage defined by an inner surface of a centerbody and having a first gaseous fuel outlet;
  - a plurality of annularly shaped air supply passages circumscribing the centerbody including at least a first air supply passage and a second air supply passage circumscribing the first air supply passage;
  - at least one splitter having an annular shape circumscribing the centerbody and separating adjacent air supply passages of the plurality of air supply passages;
  - a fuel nozzle body circumscribing the plurality of air supply passages and the at least one splitter; and
  - at least one orifice plate disposed within one of the plurality of air supply passages,
- wherein the fuel nozzle body further includes a second gaseous fuel outlet of a second gaseous fuel supply passage disposed downstream of the at least one splitter.

8. The turbine engine of claim 7, wherein a downstream terminal end of the at least one splitter is disposed downstream of the at least one orifice plate and upstream of the fuel nozzle assembly outlet.

9. The turbine engine of claim 8, wherein the downstream terminal end of the at least one splitter includes a chevron shaped portion including a set of triangle shaped turbulators each having a first edge and a second edge that converge at a major peak pointing towards the fuel nozzle assembly outlet and the combustion chamber.

10. The turbine engine of claim 9, wherein at least one turbulator of the set of turbulators further includes a set of triangle shaped mini turbulators, each of the mini turbulators having a smaller cross-sectional area than that of the set of turbulators and a minor peak pointing towards the fuel nozzle assembly outlet and the combustion chamber.

11. The turbine engine of claim 7, wherein the fuel nozzle assembly further includes a fuel post protruding from the fuel nozzle body upstream of the second gaseous fuel outlet.

12. The turbine engine of claim 7, wherein the at least one orifice plate is an annular shape and includes a plurality of apertures.

13. The turbine engine of claim 12, wherein the plurality of apertures are shaped as circles, polygons, or a combination thereof.

14. The turbine engine of claim 7, wherein the at least one orifice plate is disposed within the second air supply passage.

15. The turbine engine of claim 14, wherein the at least one orifice plate is a plurality of orifice plates and each of the plurality of air supply passages includes an orifice plate of the plurality of orifice plates disposed therein.

16. The turbine engine of claim 7, wherein the plurality of air supply passages further includes at least a third air supply passage circumscribing the second air supply passage, and the at least one splitter is at least a first splitter separating the first air supply passage and the second air supply passage, and a second splitter separating the second air supply passage and the third air supply passage.

17. The turbine engine of claim 16, wherein the at least one orifice plate includes at least a first orifice plate disposed within the first air supply passage and a second orifice plate disposed within the third air supply passage.

18. The turbine engine of claim 17, wherein the second air supply passage does not include an orifice plate.

19. The turbine engine of claim 16, wherein a downstream terminal end of the first splitter is disposed closer to the combustion chamber than a downstream terminal end of the second splitter.

* * * * *